July 30, 1935.  G. A. SCHMIDT  2,009,524

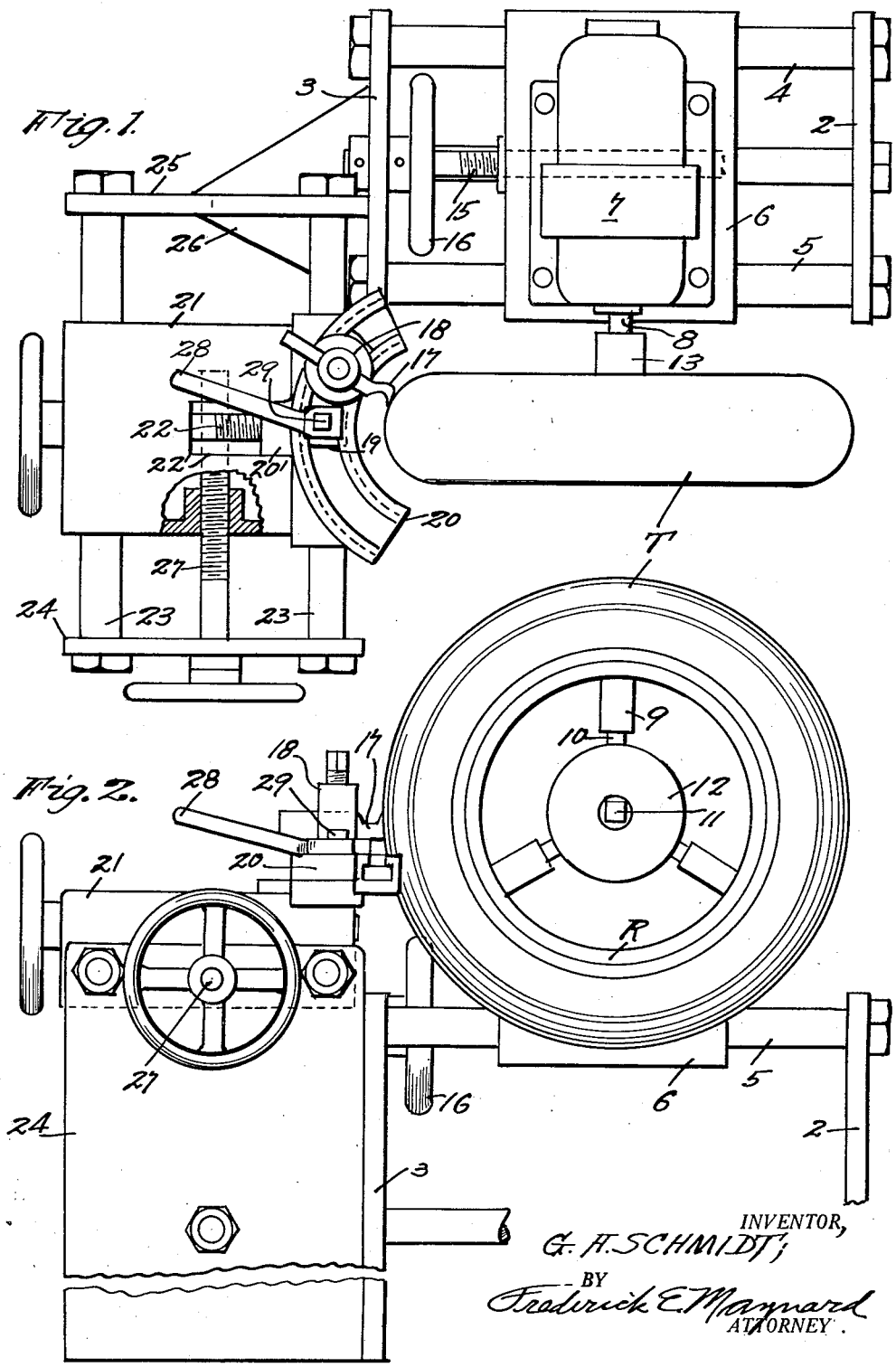

USED TIRE, FACING, STITCHING AND RETREADING MACHINE

Filed June 19, 1934  2 Sheets-Sheet 2

Patented July 30, 1935

2,009,524

UNITED STATES PATENT OFFICE 2,009,524

USED TIRE, FACING, STITCHING, AND RETREADING MACHINE

George A. Schmidt, Walnut Park, Calif.

Application June 19, 1934, Serial No. 731,295

6 Claims. (Cl. 164—38)

This invention is a machine for pneumatic tire working, especially for preparing old tires as, for instance, by the retreading thereof by the novel method shown in my application filed June 4, 1934, Ser. No. 728,907; or as in the common practice of "stitching" on a commercial wrap or lap of tire rubber known in the trade as a "camel back", to be later vulcanized in any practical manner.

It is an object to provide a powerful and capacious machine to which an operator (and a helper on very large tires) may apply one of limitless sizes and types of rim-mounted tires to a spinning spider whereby the tire is spun on its axis; the machine incorporating means for the juxtaposition of the tire and an appropriate tool for preparatory face work on the tire. Such tools are adapted for cutting the undesired residue of the worn tread down to the carcass, or in my new process, cutting a channel in so much of the old tread as may be available according to the condition of the tire.

Also, an object is to provide means for the quick and effective application of the camel back to the prepared carcass.

In general, a broad object is to provide, in a single machine, means for greatly facilitating all of the preparatory, manual work on an old tire which is in condition justifying its re-treading.

The invention consists in certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a plan of the machine; as used in facing a tire down to its carcass.

Figure 2 is a front elevation thereof, broken in altitude.

Figure 3:
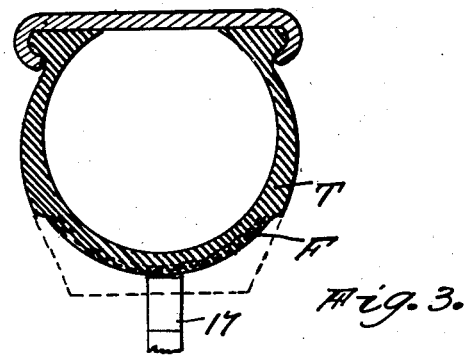
Figures 3, 4 and 5 are cross-sections, of a conventional tire, showing different preparatory operations, as set forth hereafter.

In the depicted form, the machine includes a stiff and heavy frame comprising a motor bench having a pair of spaced, vertical side plates 2—3 cross-connected by heavy bolts 4—5 which constitute parallel rails for a carriage 6 on which is fixed a geared-down motor unit 7 whose driven spindle 8 is adapted for reception of a wheel tire spider.

This spider consists of a set of radially adjustable blocks 9 operated by jack screws 10 motivated by suitable gearing having a crank or wrench shaft 11 all mounted in a gear box 12 having a hub 13 suitably fixed on the spindle 8.

The spider blocks 10 are adjustable to engage one or another of various sizes of rims R of tires T upon which work is to be done in preparation for application of a new tread body. When thus firmly mounted on the spider the tire is spun at a desired rate of speed and the motor carriage 6 is then shifted by its actuating screw 15 as the operator turns the hand-wheel 16 thereof to bring the tread part of the tire toward such working tool 17 as may have been fixed in a tool post 18.

The tool post is mounted on a segmental block 19 slidably fitting in an arcuate guide bed 20 which is slidably adjustable along a tool carrier 21 which is provided with a tool feed screw 22 engaging a nut part 20' of the tool bed 20; the carrier having a longitudinal slot 22' in which the nut works.

The tool carrier is slidably mounted on a pair of rails in the form of bolts 23 which connect main frame plates 24—25; the latter abutting the adjacent frame plate 3 and being solidly attached thereto as by welded corner brace parts 26. The main frame structure is thus substantially L-shaped in plan and the mounted tire T occupies a position in the re-entrant angle.

Figure 5:
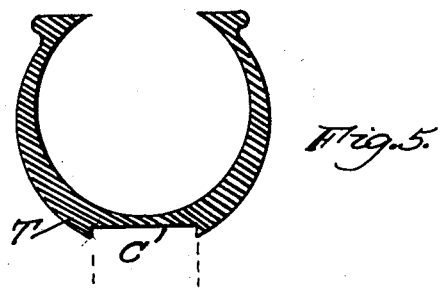

Cross-feed of the tool carrier 21 is had by means of a feed screw 27 and by this means a tool on the bed may be moved in straight lines so as to cut out a channel C, as shown in the body of the tire in Fig. 5, for reception of a pre-formed, full-circle re-tread girdle G.

When it is desired to trim off the old rubber of the tread down to and around the fabric carcass of the tire as is shown in Fig. 3, a hand lever 28 is applied to a pin 29 which is a part of the tool bed block 19 and this is then worked back and forth in the channelled bed 20 in conformance with the circle of the tire carcass fabric F, the combined movement of the block and of the carrier 21 being used if necessary, with the feed of the block bed by its screw 22.

Figure 4:
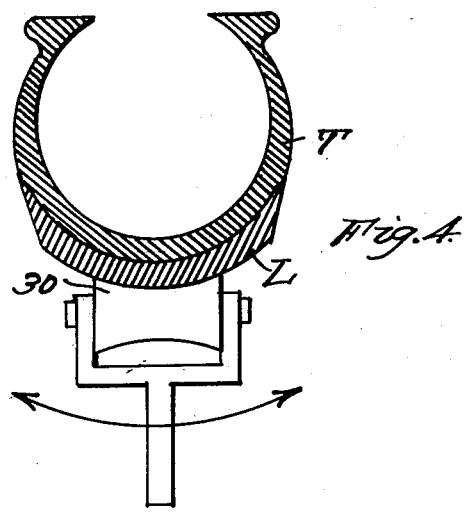

After the tire has been faced down to the carcass, a coat of rubber cement is applied to the tire face and it is ready for the application of the camel-back layer L, Fig. 4. A pressing or "stitching" roller 30, now fixed on the tool post 18, is then advanced by action of the bed 20 and the lateral motion of the carrier 21 and the layer L is firmly and uniformly worked down until its entire area of contact on the carcass is insured, and is done in a manner far superior to present day, indifferent handwork jobs and in far less time. The arrow in Fig. 4, indicated the sweep of the stitching roller during its pressing application.

The tire is subject to inflation pressure at all times while being worked on in the machine.

What is claimed is:

1. A used-tire working machine including, in combination, a tire centering spider, means to spin the spider and the tire carried thereby, means to shift the spinning spider, and mechanism for holding a tool adapted for work on the tire and for moving the tool to and from, and on the face of the tire to be worked on, said mechanism including an arcuate tool guide approximately concentric to the transverse tread curvature of a tire carcass and whereby the applied tool is guided transversely around the tread, and means to facilitate tool movement along the said guide.

2. A machine of the class described including a frame having sets of parallel rail bars which sets are at right angle to each other, a prime motor slidably mounted on one set of bars and carrying and driving a work chuck which overhangs one side of the frame to turn work clear of the frame side, a carriage slidably mounted on the other set of bars and disposed opposite to the work chuck, a tool slide mounted on the carriage for tools applicable to the work periphery, means to shift the motor toward and from the carriage, and means to shift the carriage transversely to the work chuck.

3. In a machine of the class described; a frame comprising a plurality of vertical plates forming frame legs, systems of horizontal bolt rods securing the plates in assembled relation, said rods including horizontal, top pairs in right angular relative position and forming rails, and apparatus-carrying slides operatively mounted on the pairs of rail rods, said slides being movable on paths at a right angle to each other, and one slide carrying a chuck which overhangs one side of the frame.

4. A machine of the class described, including a frame having a pair of guideways, a prime motor slidably mounted on one of said guideways and having a chuck device overhanging one side of the frame to receive work and rotate it clear of the frame, a carriage slidably mounted on the other of said guideways, and a tool support adjustably mounted on the carriage and disposed on the chuck side of the frame and operative to move a tool across the peripheral face of work on the chuck said chuck and said carriage being independently operative on the guideways.

5. A machine of the class described, including a frame having sets of guides at a right angle to each other, a prime motor adjustable along one set of guides and carrying and driving a work chuck which overhangs one side of the frame to carry work laterally clear thereof, and a carriage mounted on the other set of guides and having a tool support disposed on the chuck side of the machine for carrying and moving a tool across the adjacent face of work on the chuck.

6. A machine, of the class described, including a frame, a prime motor having a chuck device on its shaft overhanging one side of the frame to receive and rotate work clear of the frame, and a tool support; said frame having guideways upon which the tool support and the said motor are relatively movable to vary the relation between the chuck and the tool support toward or from and transversely to the work on the chuck, the guideways for the motor consisting of a set of parallel rails on which it is adjustably mounted.

GEORGE A. SCHMIDT.